United States Patent [19]
Huntington

[11] Patent Number: 5,813,627
[45] Date of Patent: Sep. 29, 1998

[54] BALLOON SUPPORT APPARATUS FOR HOT AIR BALLOON RIDE

[76] Inventor: Mary K. Huntington, 1804 Davis, McHenry, Ill. 60050

[21] Appl. No.: 829,071

[22] Filed: Mar. 31, 1997

[51] Int. Cl.$^6$ ............................... B64B 1/50; B64B 1/58; B64B 1/62
[52] U.S. Cl. ............................... 244/33; 244/31; 244/97; 244/146
[58] Field of Search .................................. 244/29, 31, 33, 244/97, 98, 146

[56] References Cited

U.S. PATENT DOCUMENTS

| | | |
|---|---|---|
| 1,866,079 | 7/1932 | Blondin ...................................... 244/31 |
| 3,270,987 | 9/1966 | Winckler et al. ........................... 244/31 |
| 4,215,834 | 8/1980 | Dunlap ....................................... 244/97 |
| 4,326,681 | 4/1982 | Eshoo ......................................... 244/97 |
| 4,421,204 | 12/1983 | Lawrence ................................... 244/33 |
| 4,758,199 | 7/1988 | Tillotson et al. ........................... 244/31 |
| 5,449,130 | 9/1995 | Huntington ................................ 244/31 |

*Primary Examiner*—Virna Lissy Mojica
*Attorney, Agent, or Firm*—Kajane McManus

[57] ABSTRACT

The balloon support apparatus for a hot air balloon ride comprises a doughnut shaped sleeve engaged within a crown area of an envelope of the hot air balloon. The sleeve contains a lighter than air substance, such as helium, in an amount sufficient to elevate the balloon envelope, the sleeve having a volume which will accommodate expansion of the lighter than air substance when heated to approximately 350° F.

14 Claims, 3 Drawing Sheets

BALLOON SUPPORT APPARATUS FOR HOT AIR BALLOON RIDE

BACKGROUND OF THE INVENTION

The present invention relates to an improved hot air balloon ride which incorporates a balloon support apparatus. More particularly, the hot air balloon envelope of the ride incorporates therein a sleeve fixed thereto which is partially filled with a lighter than air substance such as helium in an amount sufficient to maintain the balloon envelope elevated regardless of the degree of deflation of the envelope, the sleeve being deflatable and refillable as well.

PRIOR ART

Heretofore the Huntington U.S. Pat. No. 5,449,130 has disclosed a hot air balloon ride wherein a hot air balloon envelope and its depending basket have been engaged to grounded weights by a plurality of tethers such that the balloon ride has only a predetermined distance of rise, as limited by the length of the tethers, producing an amusement or carnival ride unable to attain free flight.

During periods when the balloon ride is grounded and a minimal amount of, or no, warmed air is introduced into the balloon envelope, a large gust of wind may produce an undesired effect commonly referred to as "dishing" of the balloon envelope. The dishing allows the balloon envelope to collapse to a point where it is no longer able to sustain lift, and the balloon envelope falls in a direction it is being pushed by the wind. Such dishing and potential ultimate collapse of the balloon envelope onto the ground and/or the riders within the basket therebeneath, is sought to be eliminated.

SUMMARY OF THE INVENTION

Accordingly it is a primary object of the invention to provide a balloon support apparatus which will avoid the possibility of such dishing event and subsequent collapsing of the balloon envelope.

The apparatus of the present invention accomplishes this as well as other objects by providing a sleeve within a crown area of the balloon envelope which is fillable with a lighter than air substance, such as helium, in a volume sufficient to support the weight of the balloon envelope in an elevated condition, whether the balloon envelope is inflated with hot air or not.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
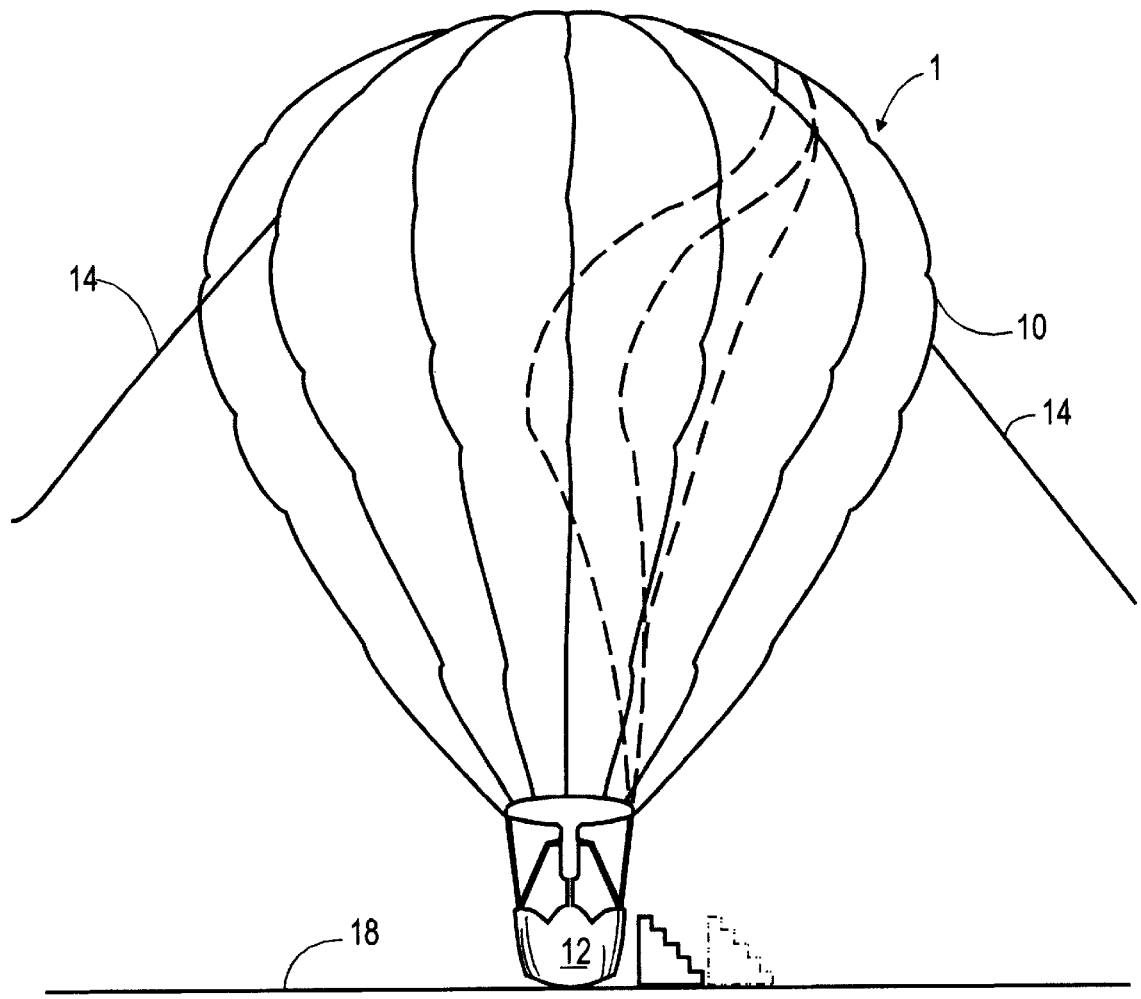
FIG. 1 is a side view of a hot air balloon ride showing various degrees of potential dishing of the balloon envelope in phantom.

Referring now to the drawings in greater detail, there is illustrated in FIG. 1 a side view of a hot air balloon ride 1 including a hot air balloon envelope 10 from which a basket 12 depends. The balloon envelope 10 is engaged to the basket 12 in known manner and is further engaged to a plurality of tether lines 14 engaged to weights (not shown) by means of which the balloon envelope 10 is prevented from attaining free flight.

As illustrated in FIG. 1 in phantom along a right side area of the balloon envelope 10, such envelope 10, when grounded and flaccid being filled with warm rather than hot air, can cave in, into itself when a gust of wind punches against a side of the balloon, creating a condition commonly referred to as dishing. When such dishing takes place, a substantial volume of hot air escapes from within the balloon envelope 10, and the weight of the balloon envelope 10 can no longer be sustained by the warm air remaining therewithin, causing collapse of the balloon envelope 10 onto subjacent structures, such as the basket 12 and ground 18 therebeneath.

To avoid such potential dishing and subsequent collapse of the balloon envelope 10, the balloon support apparatus 20 is proposed for use.

Figure 2:
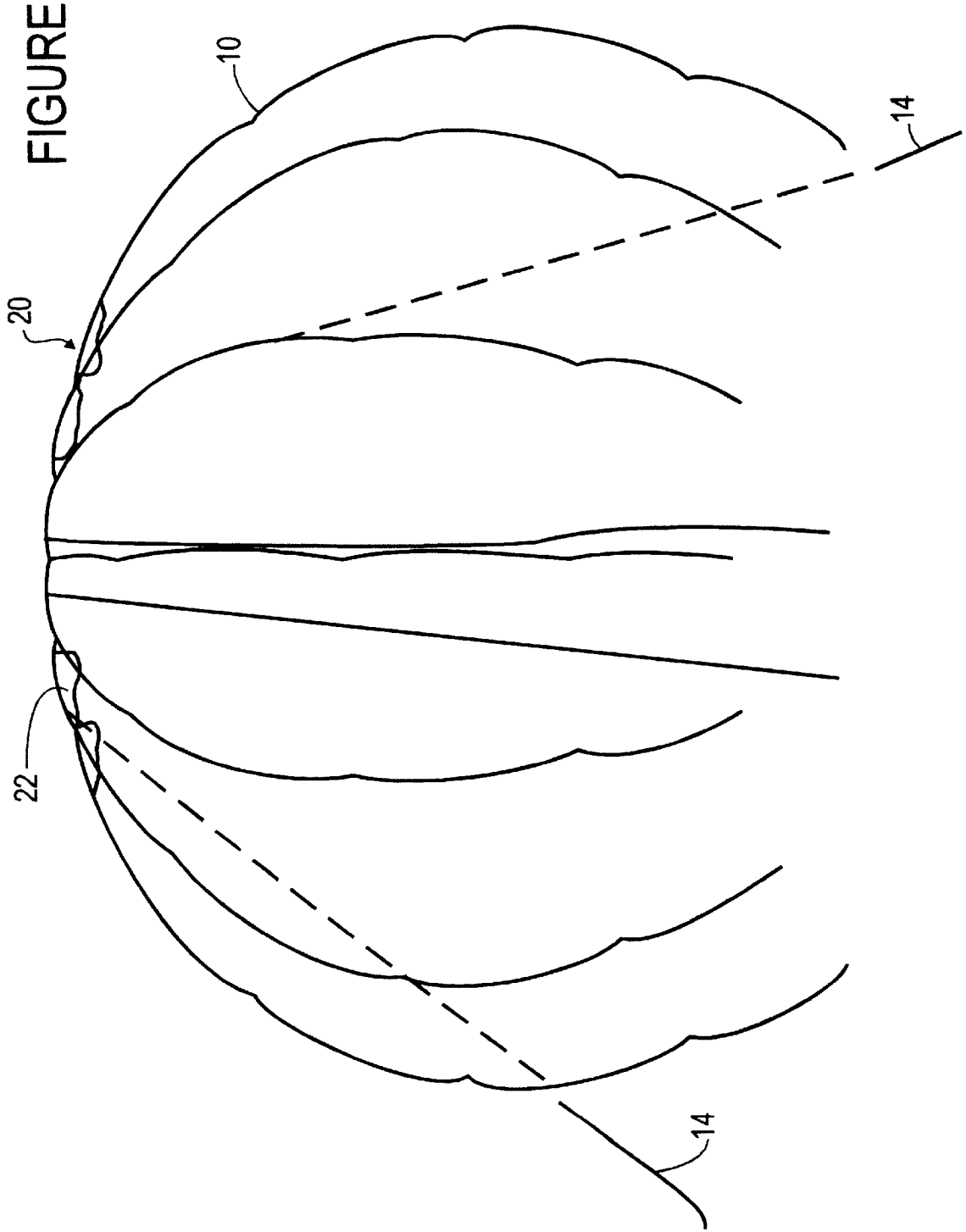
FIG. 2 is a cross sectional view through a crown portion of a hot air balloon envelope showing a helium filled sleeve engaged within the crown area.
Figure 3:
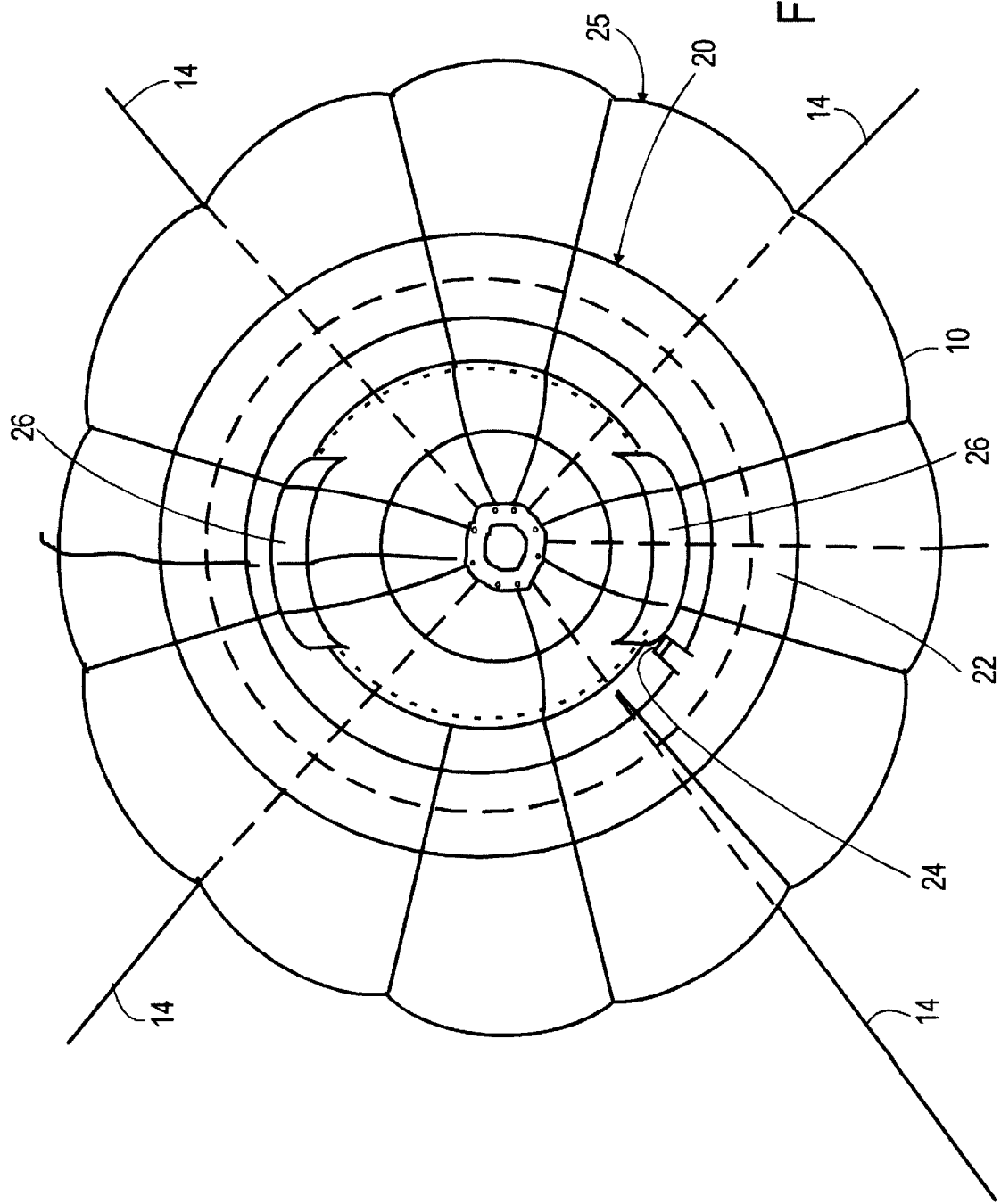
FIG. 3 is a bottom plan view looking upwardly into the crown area of the hot air balloon of FIG. 2.

As illustrated in FIGS. 2 and 3, the apparatus 20 comprises a gas impervious sleeve 22 which is doughnut shaped in configuration and has a fill port 24. The doughnut may be of a single or multi-nested sleeve 22 arrangement and only one embodiment, that of a double nested sleeve 22 is presented here for the sake of brevity. The sleeve 22 is seen to surround an area of a crown 25 of the balloon envelope 10 which includes tear away rip panels 26 which are activated to release hot air, allowing the balloon ride 1 to descend. Thus the sleeve 22 must be radially outwardly located of the rip panels 26 so as not to interfere with activation thereof. Thus the need for the doughnut configuration for the sleeve 22. A continuous sleeve 22 is proposed for quick filling but this is not to be construed as limiting. For example, a plurality of independent sleeves 22 could be used.

In the preferred embodiment illustrated, the sleeve 22 includes the single fill port 24, and such fill port 24 is preferably positioned near one of the rip panels 26 to be easily accessed through an opening created when the one rip panel 26 is torn away from the balloon envelope 10.

In use, when the balloon ride 1 reaches a temporary destination, the balloon envelope 10 is spread across the ground 18 and the tether lines 14 are shortened to keep the envelope 10 from elevating. A source of lighter than air substance, typically a lighter than air gas, such as a tank of helium (not shown) is engaged to the fill port 24, and a predetermined amount of helium is fed into the sleeve 20. The fill port 24 is then closed off in any known, suitable manner, and the tether lines are let out until the balloon envelope 10 is elevated above the basket 12 without elevating the basket 12.

With regard to predetermining the amount of the lighter than air substance required to accomplish elevation of the balloon envelope 10, several factors need to be determined.

First, the weight of the balloon envelope 10 must be determined. Then, the portion of a pound one cubic foot of the lighter than air substance can support must be determined. In the case of helium, each cubic foot thereof can support approximately 0.06 lb.

Calculation of required helium volume is accomplished for one example as follows:

$$x/y = z$$

where x=weight of balloon envelope in pounds;

y=the amount of lift created by one ft³ of the gas; and z=the number of ft³ of air gas required to maintain x elevated.

Next, it is known that air within the balloon envelope 10 is heated to obtain lift. The air temperature typically does not reach 350° F., because the balloon envelope 10 would disintegrate at a temperature slightly below this selected maximum. Gases are also known to expand when heated. Thus, a volume for the sleeve 22 must be calculated which will accommodate such expansion without bursting the sleeve 22.

In the case of helium, the coefficient of expansion in the range of temperature from 70° F. to 350° F. is known to be approximately 1.5. Thus the sleeve 22 must have a minimum volume that is equal to approximately 1.5 times the required volume of helium to obtain sustained balloon envelope 10 lift.

Calculation of required minimum envelope 10 volume is

Calculation of required minimum envelope 10 volume is accomplished for the same example as follows:

$$az=b$$

where a=coefficient of expansion for gas heated to 350° F.:

z=the number of ft³ of gas required to maintain x elevated and b=minimum volume of the sleeve needed to accommodate expansion of the gas during heating of the air within balloon envelope without possibility of bursting the sleeve.

Thus, it will be seen that the required volume of the sleeve 22 is specific not only to the weight of the balloon envelope 10 but to the lighter than air substance used as well.

Upon desired disassembly of the ride 1, after the hot air is eliminated from within the envelope 10 by tearing away the rip panels 26 allowing the hot air to escape upwardly through the openings created in the crown area 25, the balloon envelope 10 is then brought down onto the ground 18 by tightening the tether lines 14. Once the fill port 24 is accessible, it is opened and the helium is allowed to escape from within the sleeve 22 into the ambient environment.

As described above, the balloon support apparatus 20 of the present invention provides a number of advantages, some of which have been described above and others of which are inherent in the invention. Also modifications may be proposed to the apparatus 20 without departing from the teachings herein. For example, although the support apparatus 20 is proposed for use in maintaining a hot air balloon envelope 10 elevated, the apparatus 20 would also be suitable for use in maintaining other structures, such as a tent roof, elevated as well. Accordingly the scope of the invention is only to be limited as necessitated by the accompanying claims.

I claim:

1. A balloon support apparatus for use in a hot air balloon ride, the apparatus elevating and maintaining a balloon envelope of the ride, said support apparatus comprising a sleeve having a doughnut configuration engaged within a crown area of the balloon envelope, the crown area incorporating tear away rip panels, said sleeve containing a predetermined amount of a lighter than air substance and avoiding contact with said rip panels.

2. The apparatus of claim 1 wherein said sleeve is refillable.

3. The apparatus of claim 2 wherein said sleeve includes a fill port.

4. The apparatus of claim 3 wherein said fill port is accessible through an opening defined by tearing away of one of said rip panels.

5. The apparatus of claim 1 wherein said lighter than air substance is a gas.

6. The apparatus of claim 5 wherein said gas is helium.

7. The apparatus of claim 5 wherein said predetermined amount of gas is defined as $$x/y=z$$

where x=weight of balloon envelope in pounds;

y=the amount of lift created by one ft³ of the gas; and z=the number of ft³ of air gas required to maintain x elevated.

8. The apparatus of claim 7 wherein y≈0.06 lbs for helium.

9. The apparatus of claim 8 wherein z≈3300 when x≈200 lbs.

10. The apparatus of claim 9 wherein volume for the sleeve is defined as $$az=b$$

where a=coefficient of expansion for a gas heated to 350° F.:

z=the number of ft³ of gas required to maintain x elevated and b=minimum volume of the sleeve needed to accommodate expansion of gas during heating of the air within balloon envelope without possibility of bursting of sleeve.

11. The apparatus of claim 10 wherein a≈1.5 for helium.

12. The apparatus of claim 11 wherein b≈4850 when x≈200 lbs.

13. A hot air balloon ride comprising a hot air balloon envelope engaging a basket depending therefrom, the balloon envelope having a crown area with rip panels therein and incorporating a refillable gas impervious sleeve therein, said sleeve encircling the crown area radially outwardly of the rip panels and containing a lighter than air substance for maintaining the balloon envelope elevated above said basket.

14. The apparatus of claim 1 wherein said sleeve is deflatable.

* * * * *